(12) United States Patent
Son et al.

(10) Patent No.: US 8,139,187 B2
(45) Date of Patent: Mar. 20, 2012

(54) TRANSFLECTIVE TYPE LIQUID CRYSTAL DISPLAY DEVICE

(75) Inventors: Hyeon Ho Son, Gyeonggi-do (KR); Ku Hyun Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/839,258

(22) Filed: Jul. 19, 2010

(65) Prior Publication Data

US 2010/0321620 A1 Dec. 23, 2010

Related U.S. Application Data

(62) Division of application No. 11/819,823, filed on Jun. 29, 2007, now Pat. No. 7,782,427.

(30) Foreign Application Priority Data

Jun. 30, 2006 (KR) .................. 10-2006-0061539
Mar. 13, 2007 (KR) .................. 10-2007-0024267

(51) Int. Cl.
*G02F 1/133* (2006.01)
*G02F 1/00* (2006.01)

(52) U.S. Cl. ......................... 349/114; 349/75
(58) Field of Classification Search ............... 349/114, 349/75
See application file for complete search history.

(56) References Cited

U.S. PATENT DOCUMENTS

| | | | |
|---|---|---|---|
| 7,046,322 B2 * | 5/2006 | Tsuchiya | 349/114 |
| 7,106,405 B2 * | 9/2006 | Okumura | 349/129 |
| 7,139,052 B2 * | 11/2006 | Maeda | 349/114 |
| 7,385,660 B2 | 6/2008 | Kume et al. | |
| 7,403,246 B2 | 7/2008 | Maeda | |
| 7,489,376 B2 | 2/2009 | Maeda | |
| 7,525,614 B2 | 4/2009 | Jeong et al. | |
| 2004/0165129 A1 * | 8/2004 | Okumura | 349/114 |
| 2004/0212763 A1 * | 10/2004 | Tsuchiya | 349/114 |
| 2005/0001959 A1 * | 1/2005 | Chang | 349/114 |
| 2005/0001962 A1 * | 1/2005 | Maeda | 349/114 |
| 2005/0088597 A1 * | 4/2005 | Maeda et al. | 349/139 |
| 2005/0140870 A1 | 6/2005 | Kim et al. | |

(Continued)

FOREIGN PATENT DOCUMENTS

JP        2004-341524        12/2004

(Continued)

OTHER PUBLICATIONS

Office Action dated Nov. 18, 2011 in counterpart Taiwanese patent application w/transltaion.

*Primary Examiner* — K. Cyrus Kianni
(74) *Attorney, Agent, or Firm* — Morgan, Lewis & Bockius LLP

(57) ABSTRACT

A transflective type LCD device including a unit pixel region divided into reflective and transmitting parts includes first and second substrates facing each other, a pixel electrode in the pixel region of first substrate, a reflective sheet in the reflective part of first substrate, a common electrode on the second substrate, at least one first open pattern for forming multidomains, and the first open pattern in at least one of the pixel and common electrodes, and a plurality of second open patterns for inducing a fringe field, and the second open patterns in the reflective part of at least one of the pixel and common electrodes.

7 Claims, 13 Drawing Sheets

U.S. PATENT DOCUMENTS

| | | | |
|---|---|---|---|
| 2005/0140916 A1* | 6/2005 | Kume et al. | 349/156 |
| 2005/0162589 A1* | 7/2005 | Kume et al. | 349/110 |
| 2006/0007384 A1* | 1/2006 | Kurasawa | 349/155 |
| 2006/0050212 A1* | 3/2006 | Tsuchiya | 349/114 |
| 2007/0002226 A1* | 1/2007 | Sakamoto et al. | 349/114 |
| 2007/0091234 A1 | 4/2007 | Maeda | |
| 2007/0097298 A1 | 5/2007 | Maeda | |
| 2008/0218677 A1 | 9/2008 | Kume et al. | |

FOREIGN PATENT DOCUMENTS

| | | |
|---|---|---|
| TW | 594310 | 6/2004 |
| TW | 200513726 | 4/2005 |

\* cited by examiner (a)

(b)

(c)

(d)

(e)

TRANSFLECTIVE TYPE LIQUID CRYSTAL DISPLAY DEVICE

This is a divisional of U.S. patent application Ser. No. 11/819,823, filed Jun. 29, 2007 now U.S. Pat. No. 7,782,427, which is hereby incorporated by reference. This application claims the benefit of Korean Patent Application Nos. 10-2006-061539 filed on Jun. 30, 2006 and 10-2007-024267 filed on Mar. 13, 2007, both of which are hereby incorporated by reference in their entirety.

BACKGROUND OF THE INVENTION

1. Field of the Invention

Embodiments of the present invention relate to a liquid crystal display (LCD) device, and more particularly, to a transmitting-reflective (transflective) type LCD device. Embodiments of the present invention are suitable for a wide scope of applications. In particular, embodiments of the present invention are suitable for implementing a single cell gap type LCD device.

2. Discussion of the Related Art

Generally, LCD devices are driven in accordance with optical anisotropy and polarizability properties of a liquid crystal material. Liquid crystal molecules have long and thin shapes and tend to align themselves in the same direction under the influence of an electric field. In this respect, the alignment direction of the liquid crystal molecules can be controlled by applying a suitable electric field to the liquid crystal material. An image is displayed by controlling the alignment direction of the liquid crystal molecules to change the optical anisotropy of the liquid crystal material and polarize light propagating through the liquid crystal material.

The LCD device includes an array substrate with thin film transistors (TFT) and pixel electrodes; a color filter array substrate with a color filter layer; and a liquid crystal layer between the two substrates. Recently, an active matrix (AM) type LCD device has gained great attention due to the high resolution and good picture quality. The AM type LCD device includes TFTs and pixel electrodes arranged in a matrix configuration.

The LCD device cannot emit the light in itself. Thus, it is necessary for the LCD device to use an additional light source such as a backlight unit. However, the amount of light viewed through the LCD device is about 7% of the total amount of light generated from the backlight unit. Thus, a high luminance LCD device requires a large amount of light and increases the power consumption of the backlight unit. A heavy battery is required to power the backlight unit. However, the operating time of the backlight unit is limited in battery mode.

In the bright surroundings, it is difficult to recognize the images displayed on the LCD device. Accordingly, a transflective type LCD device has been studied and developed actively, which can use both the ambient light and the light generated from the backlight. The transflective type LCD device includes unit pixel regions, wherein each of the unit pixels has a transmitting part and a reflective part.

In the reflective part of transflective type LCD device, the ambient light or the light generated from the backlight unit passes through the liquid crystal layer, and is then reflected and again passes through the liquid crystal layer, whereby the light passes through the liquid crystal layer twice. For the transmitting part of transflective type LCD device, the light passes through the liquid crystal layer once. Accordingly, if the same voltage is applied to the reflective and transmitting parts, no image is displayed. In this respect, it is necessary for the transflective type LCD device to provide a dual cell gap structure where the cell gap of transmitting part is different from the cell gap of reflective part. That is, the cell gap (CG2) of transmitting part is about twice as large as the cell gap (CG1) of reflective part by forming a passivation layer having different thicknesses in the transmitting and reflective parts.

In a vertical alignment (VA) mode transflective type LCD device to form a multi-domain by forming a slit pattern in a pixel or common electrode, a dual cell gap structure is realized with an overcoat layer formed on a reflective part of color filter array substrate.

Hereinafter, the related art VA mode transflective type LCD device will be explained with reference to FIG. 1.

FIG. 1 shows a cross-sectional view of the related art VA mode transflective type LCD device. As shown in FIG. 1, the related art VA mode transflective type LCD device includes a unit cell divided into a reflective part and a transmitting part, wherein a cell gap of reflective part is different from a cell gap of transmitting part, which is referred to as a dual cell gap structure.

That is, first and second substrates 10 and 30 are provided in opposite to each other, and a liquid crystal layer 50 is formed between the first and second substrates 10 and 30. Then, a backlight unit (not shown) is provided below the first substrate 10, wherein the backlight unit emits the light.

The first substrate 10 includes gate and data lines (not shown) crossing each other to define a pixel region; a thin film transistor (not shown) formed adjacent to a crossing portion of the gate and data lines; a passivation layer (not shown) formed on the thin film transistor; a reflective sheet 11 formed on the passivation layer of reflective part so as to reflect the ambient light (natural or artificial light); an insulation layer 12 formed on the entire surface of the first substrate 10 including the reflective sheet 11; a pixel electrode 13 of transparent material formed on the insulation layer 12 and connected with a drain electrode of thin film transistor.

The pixel electrode 13 is provided with slit patterns 13a to divide the unit pixel region into multi-domains. Then, the second substrate 30 includes an R/G/B color filter layer 32 to represent colors; a common electrode 34 formed on the R/G/B color filter layer 32; and an overcoat layer 36 formed on the common electrode 34 of reflective part.

In the reflective part, the ambient light passes through the liquid crystal layer 50 at the second substrate 30, and is then reflected on the reflective sheet 11, and again passes through the liquid crystal layer 50, whereby the light passes through the liquid crystal layer 50 twice. For the transmitting part, the light passes through the liquid crystal layer once. In this case, since the cell gap (g1) of reflective part is different from the cell gap (G2) of transmitting part, the voltage properties of transmitting and reflective parts become consistent with each other by controlling the thickness of overcoat layer 36 formed on the common electrode 34 of reflective part.

However, the related art VA mode transflective type LCD device has the following disadvantages. First, it is necessary to perform, the process of depositing the overcoat layer and patterning the overcoat layer to be left only on the reflective part. Also, the gap difference occurs between the transmitting part and the reflective part due to the overcoat layer when depositing an alignment layer on the entire surface of the substrate including the overcoat layer and performing the rubbing process, whereby the rubbing defective may occur.

SUMMARY OF THE INVENTION

Accordingly, the present invention is directed to a transflective type LCD device that substantially obviates one or more problems due to limitations and disadvantages of the related art.

An object of the present invention is to provide a transflective type LCD device having a single cell gap structure where reflective and transmitting parts have the same cell gap owing to a lowered driving voltage, in which an open pattern to induce a fringe field is formed in a pixel or common electrode of reflective part.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a transflective type LCD device including a unit pixel region divided into reflective and transmitting parts includes first and second substrates facing each other, a pixel electrode in the pixel region of first substrate, a reflective sheet in the reflective part of first substrate, a common electrode on the second substrate, at least one first open pattern for forming multi-domains, and the first open pattern in at least one of the pixel and common electrodes, and a plurality of second open patterns for inducing a fringe field, and the second open patterns in the reflective part of at least one of the pixel and common electrodes.

In another embodiment, a transflective liquid crystal device includes a pixel electrode on a first substrate with a plurality of first openings for forming multi-domains within first and second portions of a pixel region, a reflective sheet within the first portion of the pixel region excluding the second region, and a common electrode on a second substrate facing the first substrate with a plurality of second openings within the first portion of the pixel region for inducing a fringe field in the pixel region.

In another embodiment, a transflective liquid crystal device includes a pixel electrode on a first substrate with a plurality of first openings for forming multi-domains within first and second portions of a pixel region and a plurality of second openings for inducing a fringe field within the first portion of the pixel region, a reflective sheet within the first portion of the pixel region excluding the second region, and a common electrode on a second substrate facing the first substrate.

In a further embodiment, a transflective liquid crystal device includes a pixel electrode on a first substrate within a pixel region having first and second portions, a plurality of protrusions on the pixel electrode, a reflective sheet within the first portion of the pixel region excluding the second region, and a common electrode on a second substrate facing the first substrate with a plurality of first openings for forming multi-domains within first and second portions of a pixel region and a plurality of second openings for inducing a fringe field within the first portion of the pixel region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 2:
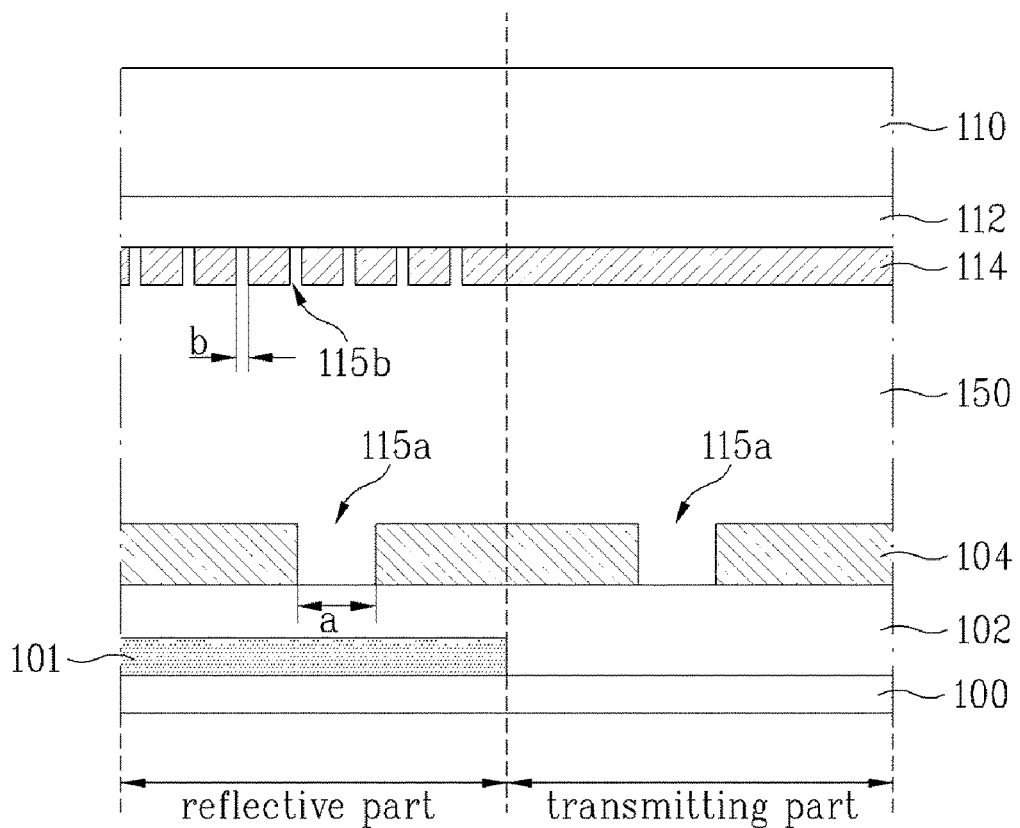
FIG. 2 shows a cross-sectional view of a VA mode transflective type LCD device according to a first embodiment of the present invention.
Figure 3A:
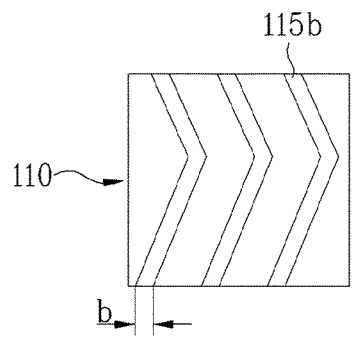
FIG. 3A shows a plane view of a common electrode in a reflective part of the transflective type LCD device of FIG. 2.
Figure 3B:
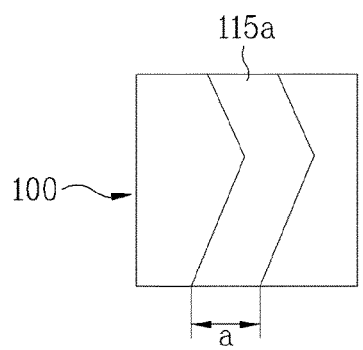
FIG. 3B shows a plane view of a pixel electrode in a reflective part of the transflective type LCD device of FIG. 2.
Figure 3C:
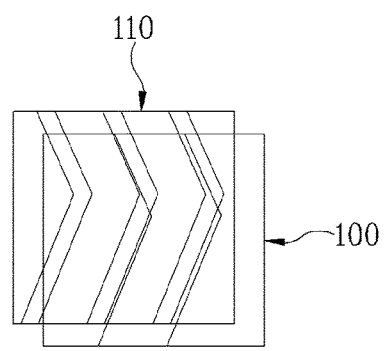
FIG. 3C shows a plane view of the common and pixel electrodes of FIGS. 3A and 3B superimposed on each other.

FIG. 2 shows a cross-sectional view of a VA mode transflective type LCD device according to a first embodiment of the present invention. FIG. 3A shows a plane view of a common electrode in a reflective part of the transflective type LCD device of FIG. 2. FIG. 3B shows a plane view of a pixel electrode in a reflective part of the transflective type LCD device of FIG. 2. FIG. 3C shows a plane view of the common and pixel electrodes of FIGS. 3A and 3B superimposed on each other. Referring to FIG. 2, a transflective type LCD device includes first and second substrates 100 and 110 facing each other; and a liquid crystal layer 150 formed between the first and second substrates 100 and 110. Then, each pixel region is divided into a reflective part and a transmitting part. Also, there is a backlight unit (not shown) which is positioned below the first substrate 100.

The first substrate 100 corresponds to a thin film transistor substrate, which includes a plurality of gate and data lines (not shown) crossing each other to define the pixel regions; and a plurality of thin film transistors (not shown) each formed adjacent to a crossing point of the gate and data lines.

In an embodiment, each of the thin film transistors includes a gate electrode protruding from the gate line; a gate insulation layer covering the gate electrode; a semiconductor layer formed on the gate insulation layer above the gate electrode; and source and drain electrodes formed at both sides of the semiconductor layer, wherein the source electrode protrudes from the data line.

Then, a passivation layer (not shown) is formed on an entire surface of the first substrate 100 including the thin film transistor. Also, a reflective sheet 101 is formed on the passivation layer of reflective part so as to reflect the ambient light. Then, an insulation layer 102 is formed on an entire surface of the first substrate 100 including the reflective sheet 101.

Above each pixel region formed on the insulation layer 102 of first substrate 100, there is a pixel electrode 104 which is electrically connected with the drain electrode of thin film transistor. In an embodiment, the pixel electrode 104 includes a first open pattern 115a, for example, slit or hole so as to divide the unit pixel region into multi-domains.

The reflective sheet 101 may be electrically connected to the drain electrode of thin film transistor. Alternatively, the pixel electrode 104 may be electrically connected with the reflective sheet 101. Further, the reflective sheet 101 may be floated.

The second substrate 110 corresponds to a color filter substrate, which includes a black matrix layer (not shown) formed corresponding to the portions except the pixel regions of first substrate; an R/G/B color filter layer 112 which represents various colors corresponding to the pixel regions; and a common electrode 114 formed on the R/G/B color filter layer 112.

The portion of the common electrode 114 facing the reflective part of the pixel includes a plurality of second open patterns 115b such as slits or holes so as to decrease a driving voltage by lowering an effective electric field with an induced fringe field. Thus, even though the same voltage is applied to the reflective and transmitting parts, it is possible to realize a single-gap transflective type LCD device because of the different birefringence ratios (Δ neff).

In an embodiment, the density of second open patterns 115b formed in the common electrode 114 of reflective part is higher than the density of first open patterns 115a. Also, a width (b) of the second open patterns 115b provided in the common electrode 114 of reflective part is smaller than a width (a) of the first open patterns 115a to form the domain. If the width (a) of the first open patterns 115a is about 6~10 μm, the width (b) of the second open patterns 115b is designed to be in a range of about 1~5 μm.

By the second open patterns 115b, the effective electric field is decreased by the fringe field without forming the multi-domain. Thus, the transmitting part has the operation properties of $\Delta nd=\lambda/2$, and the reflective part has the operation properties of $\Delta nd=\lambda/4$.

Figure 1:
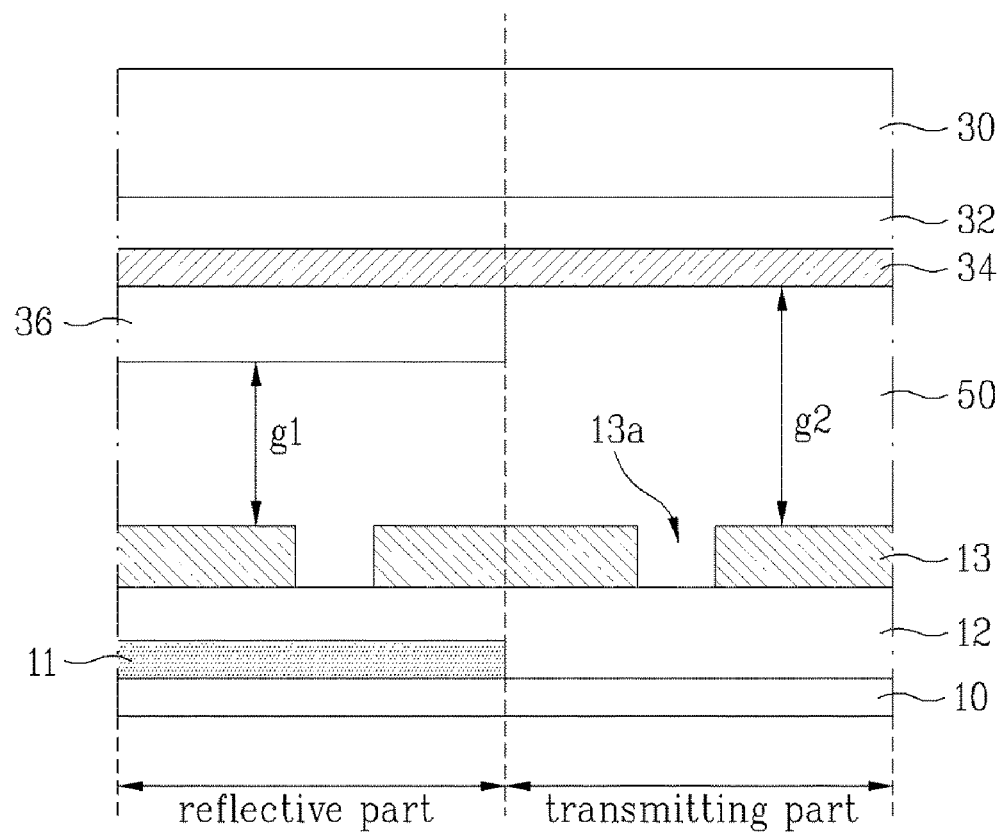
FIG. 1 shows a cross-sectional view of the related art VA mode transflective type LCD device.
Figure 4A:
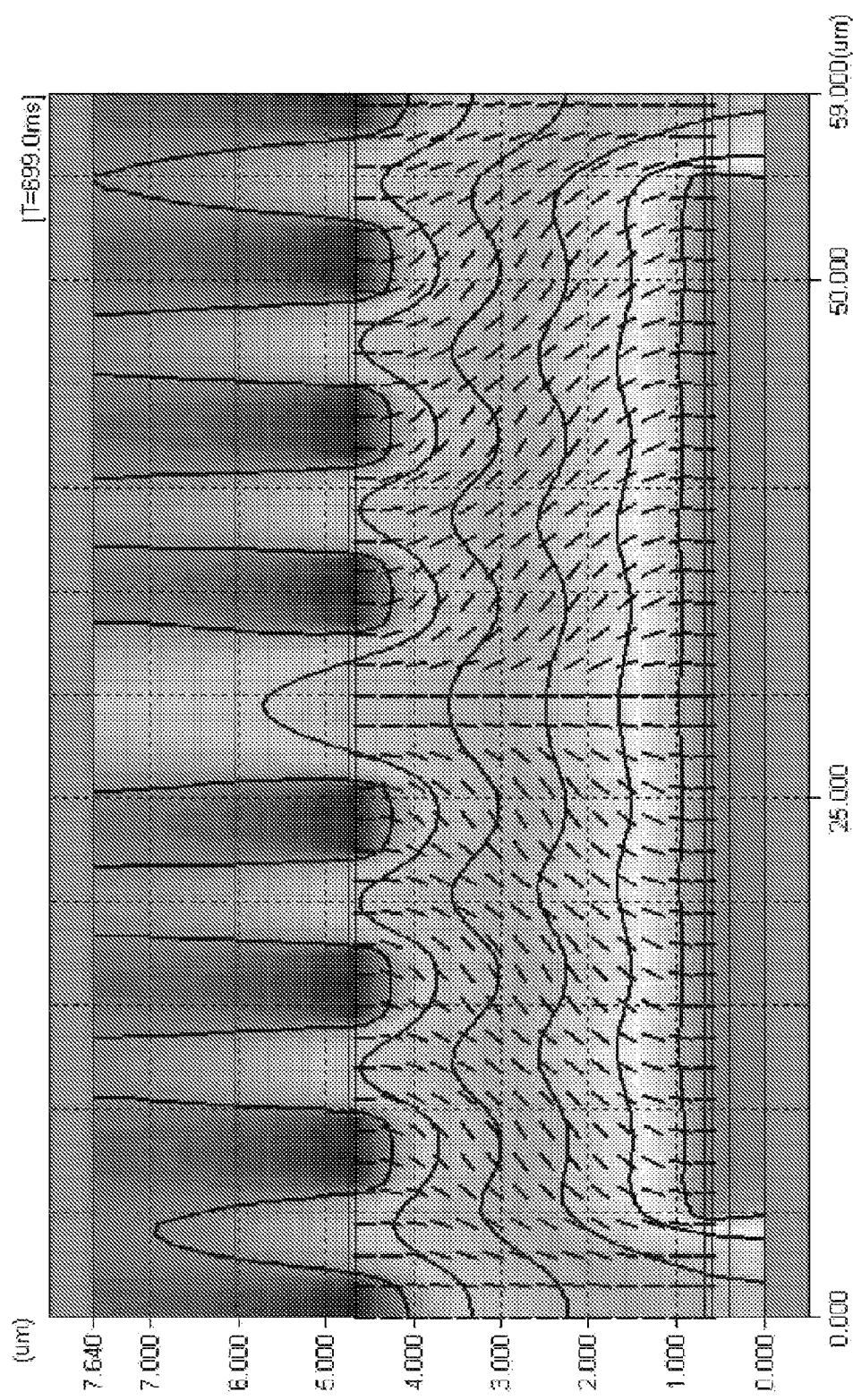
FIGS. 4A and 4B show equipotential graphs simulating reflective and transmitting parts of transflective LCD device according to the first embodiment of the present invention.
Figure 4B:
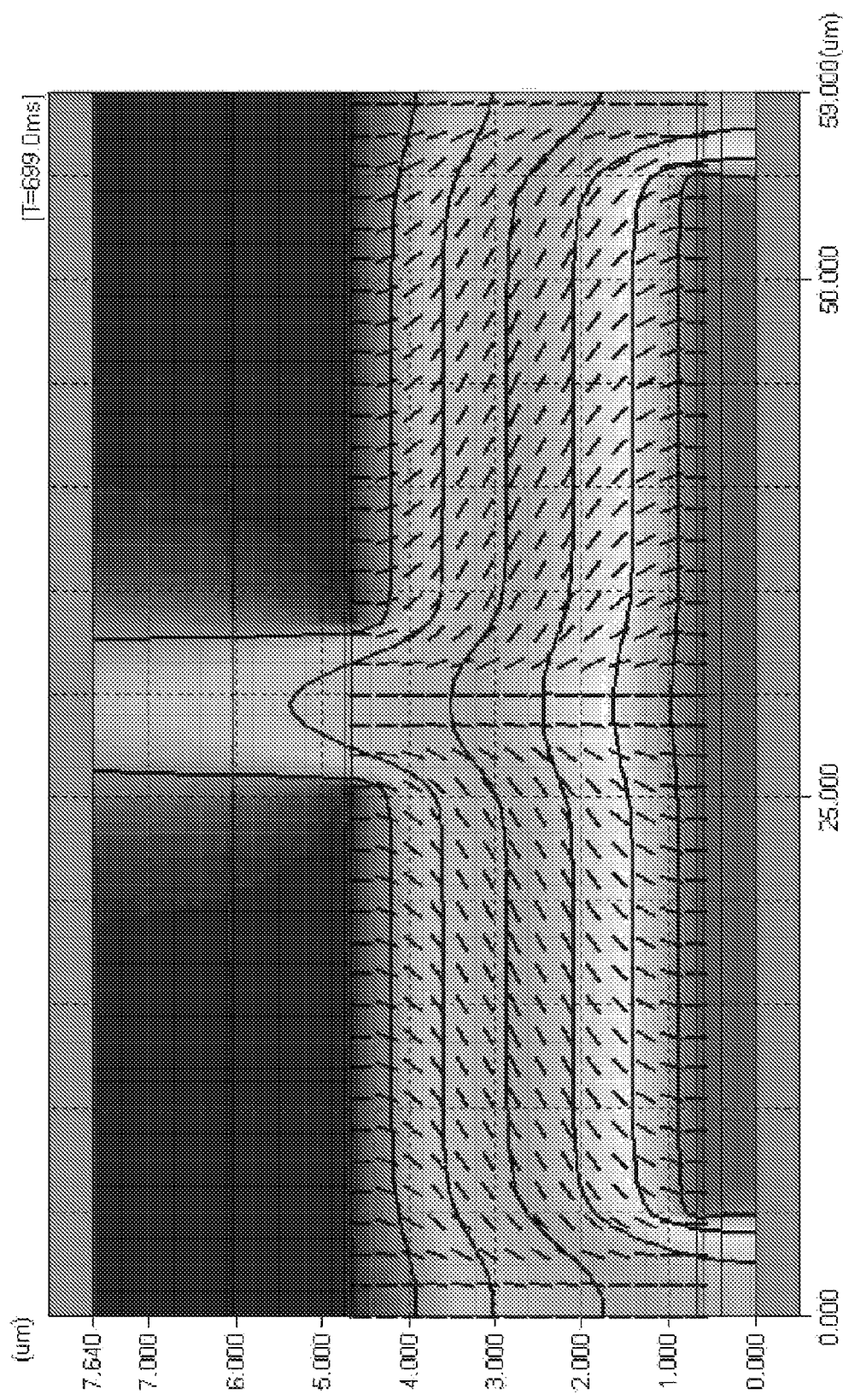
Figure 5:
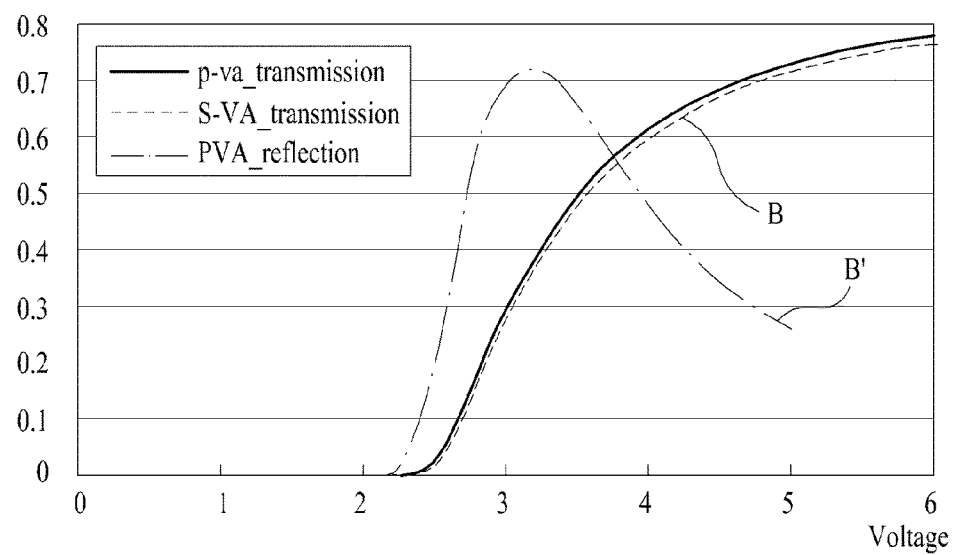
FIG. 5 shows a graph comparing a driving voltage of a transflective type LCD device of FIG. 2 to a driving voltage of the related art transflective type LCD device of FIG. 1.

FIGS. 4A and 4B show equipotential graphs simulating reflective and transmitting parts of transflective LCD device according to the first embodiment of the present invention. FIG. 5 shows a graph comparing a driving voltage of a transflective type LCD device of FIG. 2 to a driving voltage of the related art transflective type LCD device of FIG. 1. As shown in FIGS. 4A and 4B, the transmitting part of transflective type LCD device is similar to that of FIG. 1. In the reflective part of transflective type LCD device according to the present invention, the fringe field of equipotential line occurs, whereby the effective electric field is decreased. Accordingly, even though the same voltage (5V) is applied to the transmitting and reflective parts, the tilt of liquid crystal molecules in the transmitting part becomes larger.

As shown in FIG. 5, when comparing the driving voltage (B) of the transflective type LCD device including the common electrode 114 provided with the second open pattern 115b with the driving voltage (B') of the related art transflective type LCD device including the common electrode having no open pattern, the driving voltage (B) of transflective type LCD device according to the present invention is more increased than the driving voltage (B') of related art transflective type LCD device.

In this simulation, the interval between the second open patterns 115b is smaller than 5 μm. As changing the interval and density of second open pattern and applying the open pattern to the first and second substrates together, the transmitting part may be shown as the curve of VT.

Figure 6:
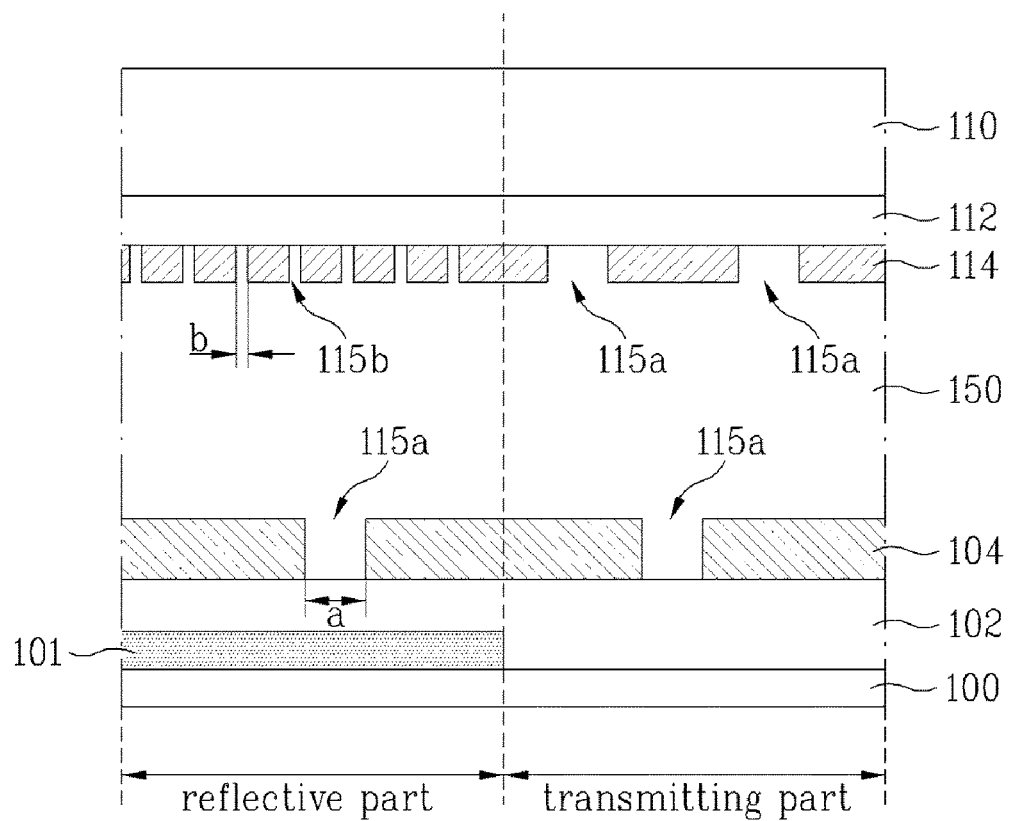
FIG. 6 shows a cross-sectional view of a VA mode transflective type LCD device according to a second embodiment of the present invention.

FIG. 6 shows a cross-sectional view of a VA mode transflective type LCD device according to a second embodiment of the present invention. The VA mode transflective type LCD device of FIG. 6 is similar in structure to the VA mode transflective type LCD device of FIG. 2. Referring to FIG. 6, the first open patterns 115a of slits or holes are formed in a common electrode 114 as well as in the pixel electrode 104. Similar to the VA mode transflective type LCD device according to the first embodiment of the present invention, the VA mode transflective type LCD device according to the second embodiment of the present invention includes the second open patterns 115b formed in a reflective part of common electrode 114.

Figure 7:
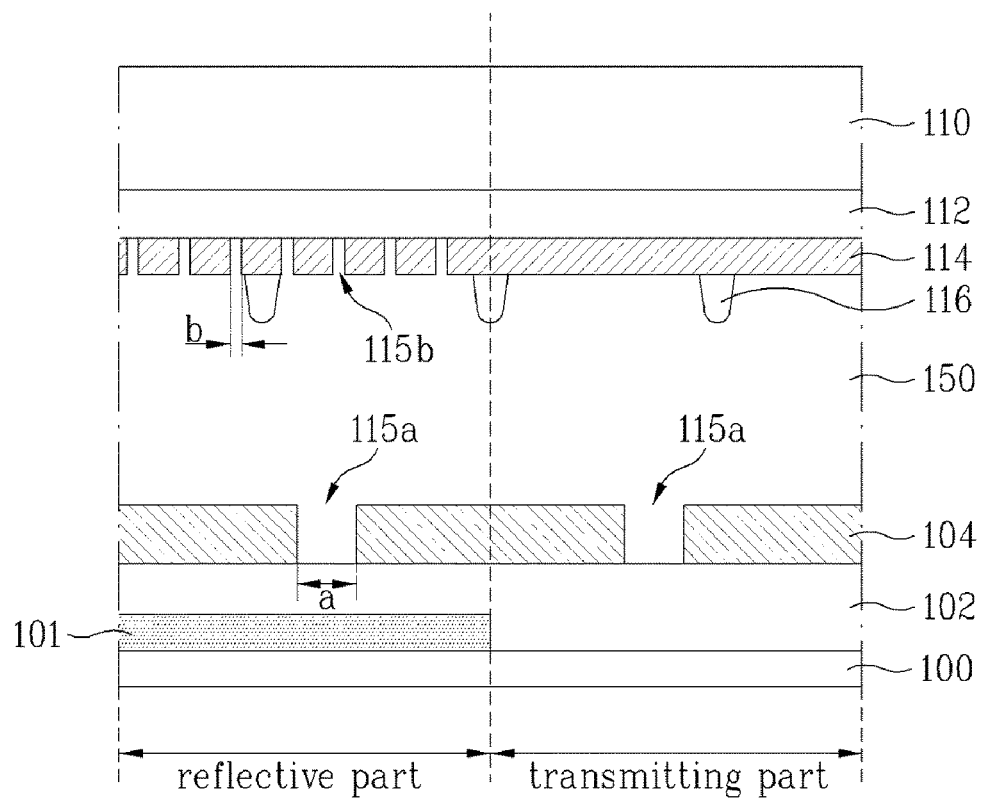
FIG. 7 shows a cross-sectional view of a VA mode transflective type LCD device according to a third embodiment of the present invention.

FIG. 7 shows a cross-sectional view of a VA mode transflective type LCD device according to a third embodiment of the present invention. The VA mode transflective type LCD device of FIG. 7 is similar in structure to the VA mode transflective type LCD device of FIG. 2. Referring to FIG. 7, protrusions 116 are formed on a common electrode 114 to divide the unit pixel into multi-domains. Similar to the VA mode transflective type LCD device according to the first embodiment of the present invention, the VA mode transflective type LCD device according to the third embodiment of the present invention includes the second open patterns 115b formed in a reflective part of common electrode 114.

In the VA mode transflective type LCD device of FIG. 2, the second open patterns are formed in the portion of the common electrode facing the reflective part. The second open patterns may be formed in the pixel electrode of reflective part to achieve the same effect. In the VA mode transflective type LCD device of FIG. 7, the second open patterns are formed in the pixel electrode of reflective part.

Figure 8:
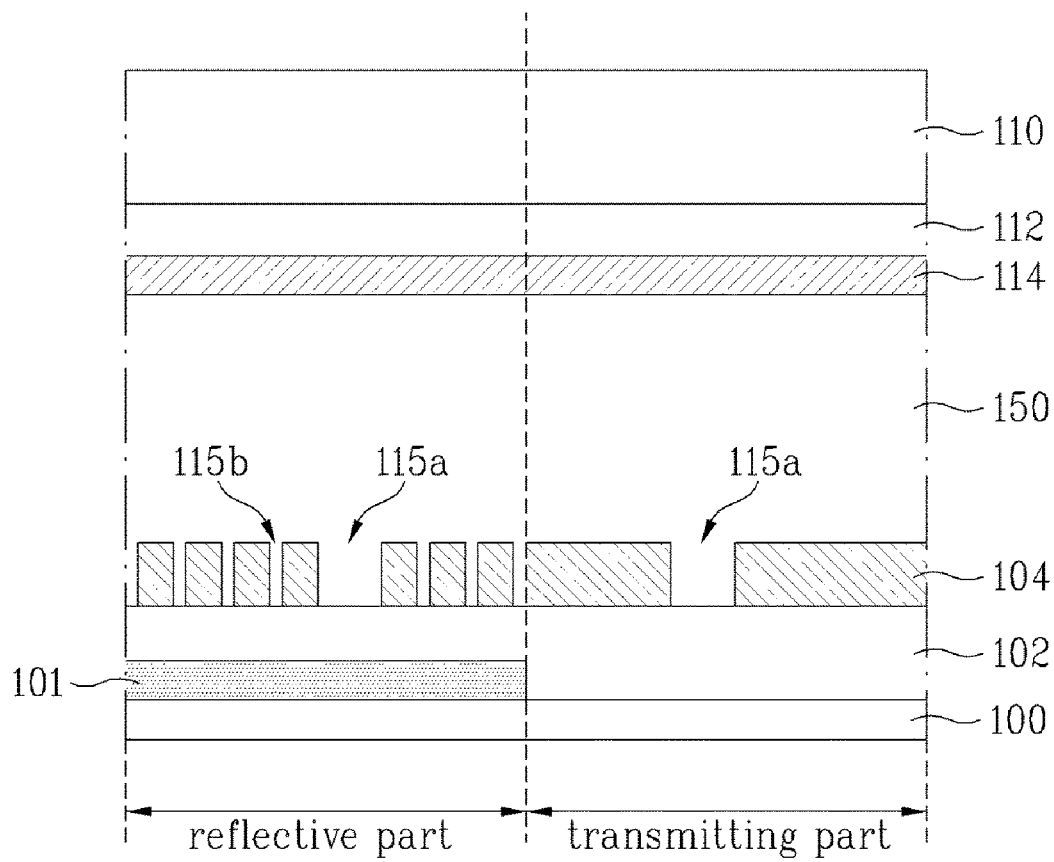
FIG. 8 shows a cross-sectional view of a VA mode transflective type LCD device according to a fourth embodiment of the present invention.
Figure 9A:
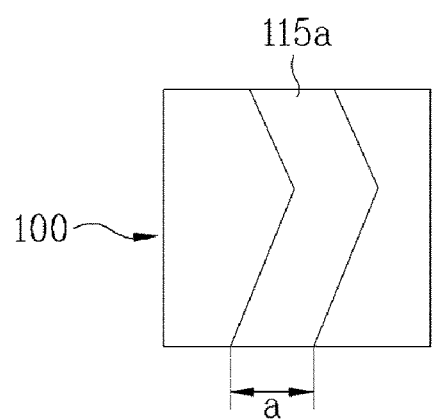
FIG. 9A shows a plane view of a pixel electrode in a transmitting part of the transflective type LCD device of FIG. 8.
Figure 9B:
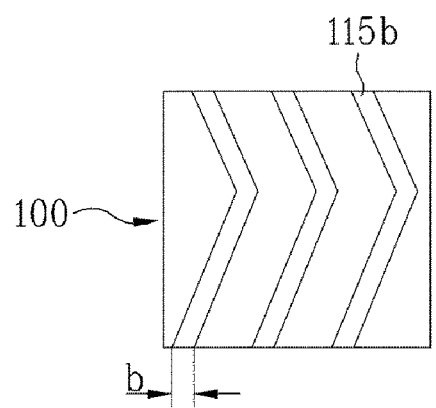
FIG. 9B shows a plane view of a pixel electrode in a reflective part of the transflective type LCD device of FIG. 8.

FIG. 8 shows a cross-sectional view of a VA mode transflective type LCD device according to a fourth embodiment of the present invention. FIG. 9A shows a plane view of a pixel electrode in a transmitting part of the transflective type LCD device of FIG. 8. FIG. 9B shows a plane view of a pixel electrode in a reflective part of the transflective type LCD device of FIG. 8.

The explanation for the VA mode transflective type LCD device of FIG. 8 will use the same reference numbers as those of FIG. 2 to refer to the same or like parts. Also, the description for the similar parts of the first and fourth embodiments will be omitted, and the explanation for the fourth embodiment will be focused on the differential structure and properties.

As shown in FIG. 8, a pixel electrode 104 is formed in each pixel region on an insulation layer 102 of first substrate 100, wherein the pixel electrode 104 is electrically connected to a drain electrode of the TFT. In this case, a plurality of first open patterns 115a of slits or holes are formed in the pixel electrode 104 to divide a unit pixel into multi-domains. Then, a plurality of second open patterns 115b are formed in the portion of the pixel electrode 104 within the reflective part of the pixel to induce a fringe field, whereby an effective electric field is decreased and a driving voltage is lowered.

Then, a second substrate 110 of color filter array substrate is prepared, which includes a black matrix layer (not shown) formed corresponding to the portions except the pixel regions of first substrate; an R/G/B color filter layer 112 which represents various colors corresponding to the pixel regions; and a common electrode 114 formed on the R/G/B color filter layer 112.

The plurality of second open patterns 115b are formed in the pixel electrode 104 of reflective part. Thus, even though the same voltage is applied to the reflective and transmitting parts, it is possible to realize a single-gap transflective type LCD device by the different birefringence ratios (Δ neff).

In an embodiment, the density of second open patterns 115b formed in the pixel electrode 104 of reflective part is higher than the density of first open patterns 115a. Also, a width (b) of the second open patterns 115b provided in the pixel electrode 104 of reflective part is smaller than a width (a) of the first open patterns 115a to form the domain. If the width (a) of the first open patterns 115a is about 6~10 μm, the width (b) of the second open patterns 115b is designed to be about 1~5 μm.

By the second open patterns 115b, the effective electric field is decreased by the fringe field without forming the multi-domain. Thus, the transmitting part has the operation properties of Δ nd=λ/2, and the reflective part has the operation properties of Δ nd=λ/4.

The fourth embodiment of the present invention may be applied to the VA mode transflective type LCD device according to the second and third embodiments of the present invention.

For example, as shown in FIG. 6, the first open patterns 115a to divide the unit pixel into the multi-domains are formed in the pixel electrode 104 and the common electrode 114. In addition, a plurality of second open patterns 115b are formed in the portion of the pixel electrode 104 within the reflective part of the pixel to induce a fringe field, whereby an effective electric field is decreased and a driving voltage is lowered.

Also, shown in FIG. 7, the first open patterns 115a to divide the unit pixel into the multi-domains are formed in the pixel electrode 104, and the plurality of protrusions 116 are formed on the common electrode 114. Further, a plurality of second open patterns 115b are formed in the portion of the pixel electrode 104 within the reflective part of the pixel to induce a fringe field, whereby an effective electric field is decreased and a driving voltage is lowered.

In a VA mode transflective type LCD device including a plurality of first open patterns of slits or holes formed in a common electrode, and a plurality of protrusions formed on a pixel electrode to form multi-domains, a plurality of second open patterns may be formed in the pixel or common electrode corresponding to a reflective part so as to form a fringe field. This will be explained as follows.

Figure 10:
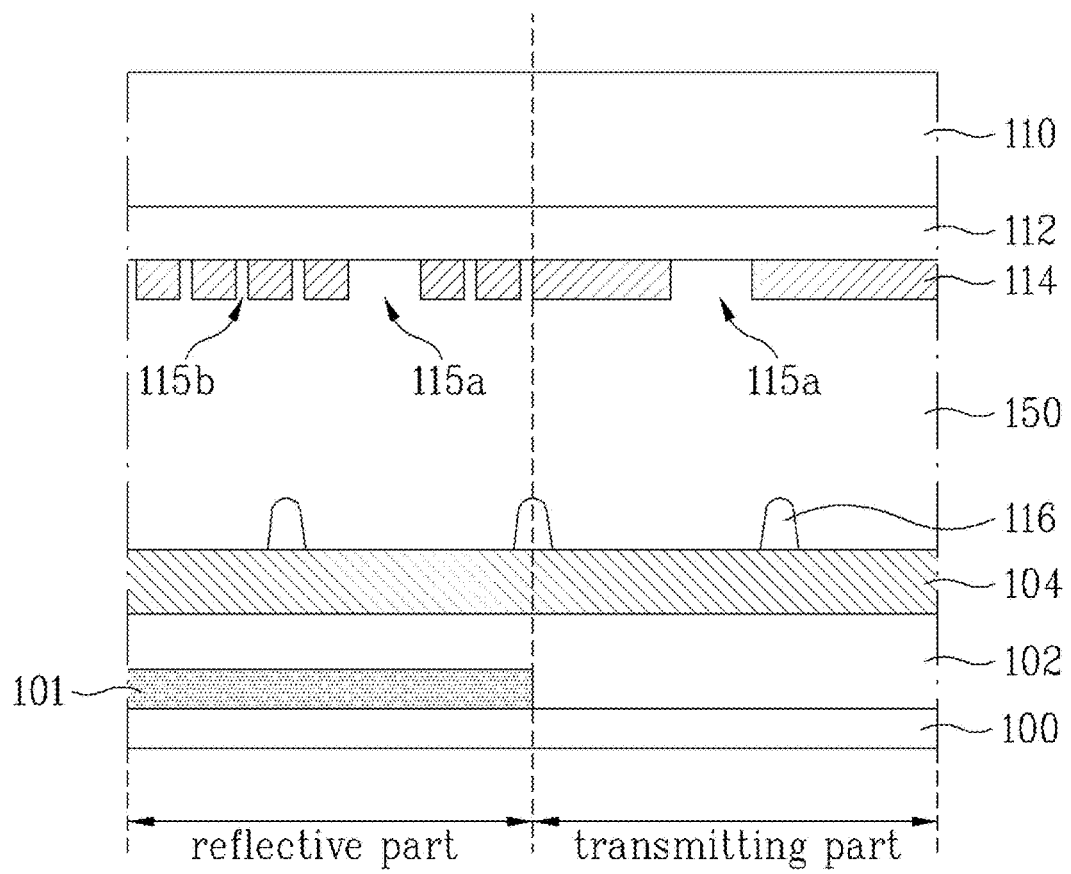
FIG. 10 shows a cross-sectional view of a VA mode transflective type LCD device according to a fifth embodiment of the present invention.

FIG. 10 shows a cross-sectional view of a VA mode transflective type LCD device according to a fifth embodiment of the present invention. The explanation for the VA mode transflective type LCD device of FIG. 10 will use the same reference numbers through the drawings as those of FIG. 2 to refer to the same or like parts. Also, the description for the similar parts will be omitted, and the explanation for the fourth embodiment will be focused on the differential structure and properties.

As shown in FIG. 10, a pixel electrode 104 is formed in each pixel region on an insulation layer 102 of first substrate 100, wherein the pixel electrode 104 is electrically connected with a drain electrode of thin film transistor. In this case, a plurality of protrusions 116 are formed on the pixel electrode 104 so as to divide a unit pixel into multi-domains.

Then, a second substrate 110 of color filter array substrate is prepared, which includes a black matrix layer (not shown) formed corresponding to the portions except the pixel regions of first substrate; an R/G/B color filter layer 112 which represents various colors corresponding to the pixel regions; and a common electrode 114 formed on the R/G/B color filter layer 112.

Then, a plurality of first open patterns 115a of slits or holes are formed in the common electrode 114 so as to form the unit pixel into the multi-domains. Also, a plurality of second open patterns 115b of slits or holes are formed in the common electrode 114 of reflective part so as to induce a fringe field, thereby decreasing an effective electric field and lowering a driving voltage.

The plurality of second open patterns 115b are formed in the pixel electrode 104 of reflective part. Thus, even though the same voltage is applied to the reflective and transmitting parts, it is possible to realize a single-gap transflective type LCD device by the different birefringence ratios (Δ neff). In an embodiment, the density of the second open patterns 115b formed in the common electrode 114 of reflective part is higher than the density of first open patterns 115a. Also, a width (b) of the second open patterns 115b provided in the common electrode 114 of reflective part is smaller than a width (a) of the first open patterns 115a to form the domain. If the width (a) of the first open patterns 115a is about 6~10 μm, the width (b) of the second open patterns 115b is designed to be about 1~5 μm.

By the second open patterns 115b, the effective electric field is decreased by the fringe field without forming the multi-domain. Thus, the transmitting part has the operation properties of Δ nd=λ/2, and the reflective part has the operation properties of Δ nd=λ/4.

In the first to fifth embodiments of the present invention, the plurality of second open patterns may be formed in the pixel and common electrodes of reflective part, to thereby induce the fringe field. This will be explained in detail.

Figure 11:
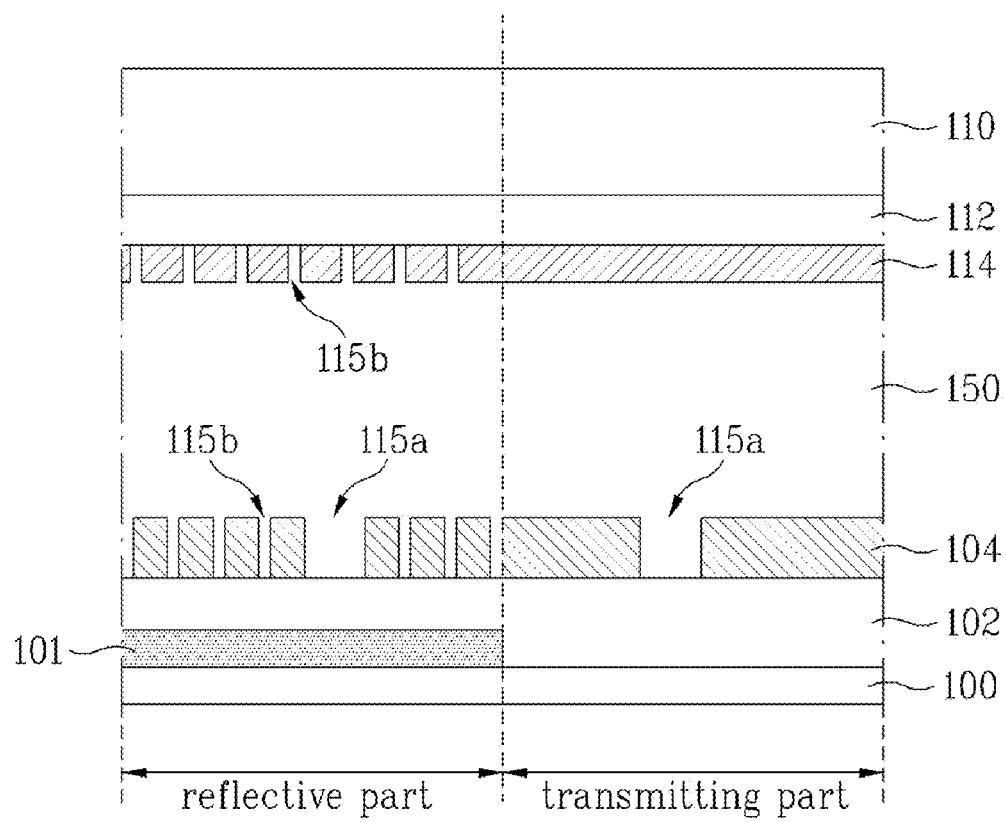
FIG. 11 shows a cross-sectional view of a VA mode transflective type LCD device according to a sixth embodiment of the present invention.

FIG. 11 is a cross section view of illustrating a VA mode transflective type LCD device according to the sixth embodiment of the present invention.

As mentioned above, the VA mode transflective type LCD device according to the present invention may include the first open patterns of slits or holes formed in the pixel or common electrode so as to realize the multi-domains; may includes the plurality of first open patterns of slits or holes formed in both the pixel and common electrodes so as to realize the multi-domains; or may include the plurality of first open patterns of slits or holes formed in any one of the pixel and common electrodes, and the plurality of protrusions formed in the other of the pixel and common electrodes. In this structure, the plurality of second open patterns may be formed in the pixel and common electrodes of reflective part, so as to induce the fringe field.

FIG. 11 shows a cross-sectional view of a VA mode transflective type LCD device according to a sixth embodiment of the present invention. As shown in FIG. 11, the transflective type LCD device of FIG. 10 includes first and second substrates 100 and 110 facing each other; and a liquid crystal layer 150 formed between the first and second substrates 100 and 110. Then, each pixel region is divided into a reflective part and a transmitting part. Also, there is a backlight unit (not shown) which is positioned below the first substrate 100.

The first substrate 100 corresponds to a thin film transistor substrate, which includes a plurality of gate and data lines (not shown) crossing each other to define the pixel regions; and a plurality of thin film transistors (not shown) each formed adjacent to a crossing point of the gate and data lines.

In an embodiment, each of the TFTs includes a gate electrode protruding from the gate line; a gate insulation layer covering the gate electrode; a semiconductor layer formed on the gate insulation layer above the gate electrode; and source and drain electrodes formed at both sides of the semiconductor layer, wherein the source electrode protrudes from the data line.

Then, a passivation layer (not shown) is formed on the entire surface of the first substrate 100 including the thin film transistor. Also, a reflective sheet 101 is formed on the passivation layer of reflective part so as to reflect the ambient light. Then, an insulation layer 102 is formed on the entire surface of the first substrate 100 including the reflective sheet 101.

Also, a pixel electrode 104 is formed in each pixel region on the insulation layer 102 of first substrate 100, wherein the pixel electrode 104 is electrically connected with the drain electrode of thin film transistor. In this case, a plurality of first open patterns 115a of slits or holes are formed in the pixel electrode 104, to thereby divide the unit pixel into multi-domains. In this case, the reflective sheet 101 is electrically connected with the drain electrode of thin film transistor, and the pixel electrode 104 is electrically connected with the reflective sheet 101.

Also, a plurality of second open patterns 115b of slits or holes are formed in the pixel electrode 104 of reflective part, so as to induce the fringe field, thereby decreasing the effective electric field and lowering the driving voltage.

The second substrate 110 corresponds to a color filter substrate, which includes a black matrix layer (not shown) formed corresponding to the portions except for the pixel regions of first substrate; an R/G/B color filter layer 112 which represents various colors corresponding to the pixel regions; and a common electrode 114 formed on the R/G/B color filter layer 112.

For the common electrode 114, the common electrode 114 corresponding reflective part includes a plurality of second open patterns 115b such as slits or holes so as to decrease the driving voltage by lowering the effective electric field with the induced fringe field.

The plurality of second open patterns 115b are formed in the pixel and common electrodes 104 and 114 of reflective part. Thus, even though the same voltage is applied to the reflective and transmitting parts, it is possible to realize a single-gap transflective type LCD device by the different birefringence ratios ($\Delta$ neff).

In an embodiment, the density of second open patterns 115b formed in the pixel and common electrodes 104 and 114 of reflective part is higher than the density of first open patterns 115a. Also, the width (b) of the second open patterns 115b provided in the common electrode 114 of reflective part is smaller than the width (a) of the first open patterns 115a to form the domain.

By the second open patterns 115b, the effective electric field is decreased by the fringe field without forming the multi-domain. Thus, the transmitting part has the operation properties of $\Delta$ nd=$\lambda$/2, and the reflective part has the operation properties of $\Delta$ nd=$\lambda$/4.

In the sixth embodiment of the present invention, the density and interval of second open pattern 115b may be the same as or smaller than those of the first to fifth embodiments.

Although not shown, on the analogy of the second to fifth embodiments of the present invention, the plurality of second open patterns are formed in the pixel and common electrodes of reflective part to induce the fringe field in the various VA mode transflective type LCD devices.

Also, the simulations of the second to sixth embodiments of the present invention have the similar values to those of FIGS. 4A, 4B and 5.

Figure 12:
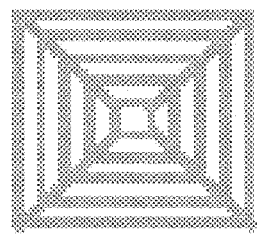
FIG. 12 shows a plane view of exemplary open patterns in accordance with an embodiment of the present invention.
Figure 12:
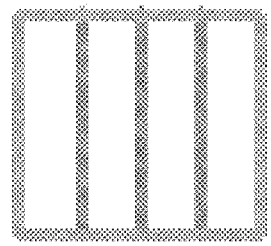
Figure 12:
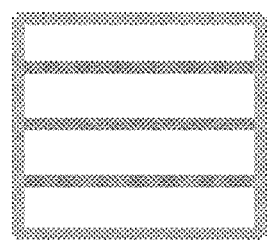
Figure 12:
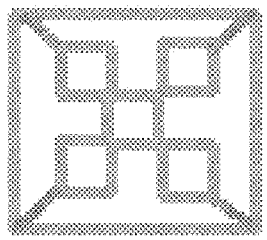
Figure 12:
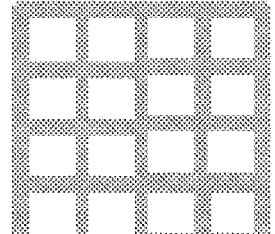

FIG. 12 shows a plane view of exemplary open patterns in accordance with an embodiment of the present invention. According to an embodiment of the present invention, the second open pattern 115b is formed in shape of slanted lines. However, as shown in FIG. 12, the second open patterns 115 of various shapes can be formed.

According as the second open patterns are formed in the various shapes, the pixel or common electrode of reflective part may be formed in shape of the cobweb (FIG. 12A), the window frame (FIG. 12B) of horizontal or vertical line, or the checkerboard (FIG. 12C).

For the transflective type LCD device of single cell gap structure according to the present invention, it is unnecessary to perform the step of forming an overcoat layer, thereby simplifying the manufacturing process. Thus, the open patterns are formed in the pixel or common electrode of reflective part, so that the voltage properties of reflective part become similar to that of transmitting part.

As mentioned above, the transflective type LCD device according to the present invention has the following advantages. First, the reflective part has the operation properties of $\Delta$ nd=$\lambda$/4 without forming the overcoat layer, whereby the process is simplified. Since the overcoat layer is not formed, the single gap is realized without the gap difference, to thereby decrease the defective alignment. Thus, the yield is improved and the manufacturing cost is decreased.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A transflective liquid crystal device, comprising:
a pixel electrode on a first substrate with a plurality of first openings for forming multi-domains, the plurality of first openings within a reflective part and a transmitting part of a pixel region, and a plurality of second openings for inducing a fringe field, the plurality of second openings within the reflective part of the pixel region excluding the transmitting part of a pixel region;
a reflective sheet within only the reflective part of the pixel region;
a common electrode on a second substrate facing the first substrate, the common electrode having a plurality of third openings within the reflective part of the common electrode for inducing a fringe field; and
a liquid crystal layer between the first and second substrates,
wherein the reflective and transmitting parts have the same cell gap, and the transmitting part has the operation properties of a retardation value ($\Delta$nd)=$\lambda$/2 and the reflective part has the operation properties of retardation value ($\Delta$nd)=$\lambda$/4 by the fringe field, wherein the $\Delta$n is a refracted index of the liquid crystal layer, and the n is a cell gap between the first and second substrates.

2. The transflective liquid device of claim 1, wherein each of the third plurality of openings has a size substantially the same as each of the second plurality of openings.

3. A transflective type LCD device including a unit pixel region divided into reflective and transmitting parts, comprising:
 first and second substrates facing each other;
 a pixel electrode in the pixel region of first substrate;
 a reflective sheet in only the reflective part of first substrate;
 a common electrode on the second substrate;
 a plurality of first open patterns for forming multi-domains, the first open patterns in the pixel electrode within the reflective part and the transmitting part of the pixel region;
 a plurality of second open patterns for inducing a fringe field, and the third open patterns in only the reflective part of the pixel region;
 a plurality of third open patterns for inducing a fringe field, and the third open patterns in only the reflective part of the common electrode; and
 a liquid crystal layer between the first and second substrates,
 wherein the reflective and transmitting parts have the same cell gap, and the transmitting part has the operation properties of a retardation value $(\Delta nd)=\lambda/2$ and the reflective part has the operation properties of retardation value $(\Delta nd)=\lambda/4$ by the fringe field, wherein the $\Delta n$ is a retracted index of the liquid crystal layer, and the n is a cell gap between the first and second substrates.

4. The transflective type LCD device of claim 3, wherein the second open patterns have a density higher than the first open patterns.

5. The transflective type LCD device of claim 3, wherein the first open patterns have a width of about 6~10 μm, and the second open patterns have a width of about 1~5 μm.

6. The transflective type LCD device of claim 3, wherein the first and second open patterns have a shape of slits or holes.

7. The transflective type LCD device of claim 3, further comprising a plurality of protrusions in at least one of the pixel and common electrodes.

* * * * *